United States Patent
Noh et al.

(10) Patent No.: US 9,408,225 B2
(45) Date of Patent: Aug. 2, 2016

(54) METHOD AND APPARATUS FOR COOPERATIVE SCHEDULING USING INTERFERENCE BETWEEN MULTIPLE POINTS

(75) Inventors: Won Jong Noh, Yongin-si (KR); Kwang Hoon Han, Icheon-si (KR); Chang Yong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 539 days.

(21) Appl. No.: 13/487,285

(22) Filed: Jun. 4, 2012

(65) Prior Publication Data

US 2013/0003638 A1     Jan. 3, 2013

(30) Foreign Application Priority Data

Jun. 28, 2011 (KR) .......................... 10-2011-0062786

(51) Int. Cl.
*H04W 72/12* (2009.01)
*H04L 12/891* (2013.01)

(52) U.S. Cl.
CPC ........... *H04W 72/1231* (2013.01); *H04L 47/41* (2013.01)

(58) Field of Classification Search
CPC ........................................................ H04W 4/06
See application file for complete search history.

(56) References Cited

U.S. PATENT DOCUMENTS

| | | | |
|---|---|---|---|
| 2007/0117570 A1* | 5/2007 | Noh | H04L 1/0026 455/452.2 |
| 2007/0133556 A1* | 6/2007 | Ding | H04L 41/147 370/395.4 |
| 2008/0261645 A1 | 10/2008 | Luo et al. | |
| 2009/0185521 A1 | 7/2009 | Li et al. | |
| 2010/0157924 A1* | 6/2010 | Prasad | H04L 1/0025 370/329 |
| 2011/0044163 A1* | 2/2011 | Nishioka | H04L 45/00 370/217 |

FOREIGN PATENT DOCUMENTS

| | | |
|---|---|---|
| JP | 2000-505629 A | 5/2000 |
| KR | 10-2008-0076643 A | 8/2008 |
| KR | 10-0958227 B1 | 5/2010 |
| KR | 10-2010-0092024 A | 8/2010 |
| KR | 10-2010-0118534 A | 11/2010 |
| KR | 10-2011-0002586 A | 1/2011 |

\* cited by examiner

*Primary Examiner* — Sulaiman Nooristany
(74) *Attorney, Agent, or Firm* — NSIP Law

(57) ABSTRACT

A method and an apparatus are described for a cooperative scheduling using interference between multiple points. For each link, a cooperation set is set including cooperation links for a cooperative scheduling. A cooperation session map is generated that defines a cooperation link selected from the cooperation set for each link in each session of a network. A cooperation group is determined to be scheduled simultaneously using the cooperation session map.

22 Claims, 11 Drawing Sheets

| SET | L1 | L2 | L3 | L4 | L5 | L6 | L7 |
|---|---|---|---|---|---|---|---|
| SESSION | A,B | A,C | .... | .... | .... | | |
| C0 | N/A | | 0 | | 0 | | 0 |
| C1 | | 0.9 | | | | | |
| C2 | | | | 0.6 | | 0.5 | |

| SET | SESSION-1 | SESSION-2 | SESSION-3 |
|-----|-----------|-----------|-----------|
| L1  | L2        |           |           |
| L2  |           | L1        |           |
| L3  | L4        |           |           |
| L4  |           | L3, L5    |           |
| L5  |           |           | L4        |

FIG. 7

| SET | SESSION-1 | SESSION-2 | SESSION-3 |
|---|---|---|---|
| ROUTE PATH | L1 - L3 - --- | L2 - L4 - --- | L5 - --- |

| SET | SESSION-1 | | SESSION-2 | | SESSION-3 | |
|---|---|---|---|---|---|---|
| L1 | L2,L3(X) | | | | | |
| L2 | | | L1,L4(X) | | | |
| L3 | | L4,L1(X) | | | | |
| L4 | | | | L3,L5 L2(X) | | |
| L5 | | | | | | L4 |

750 — L1
710 — L2
730 — L4

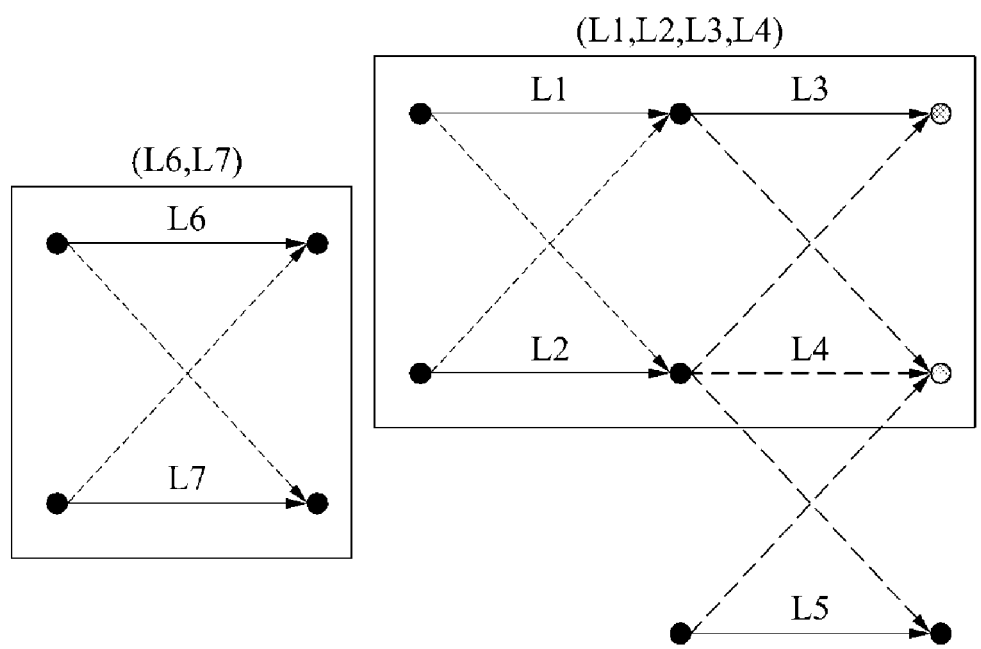

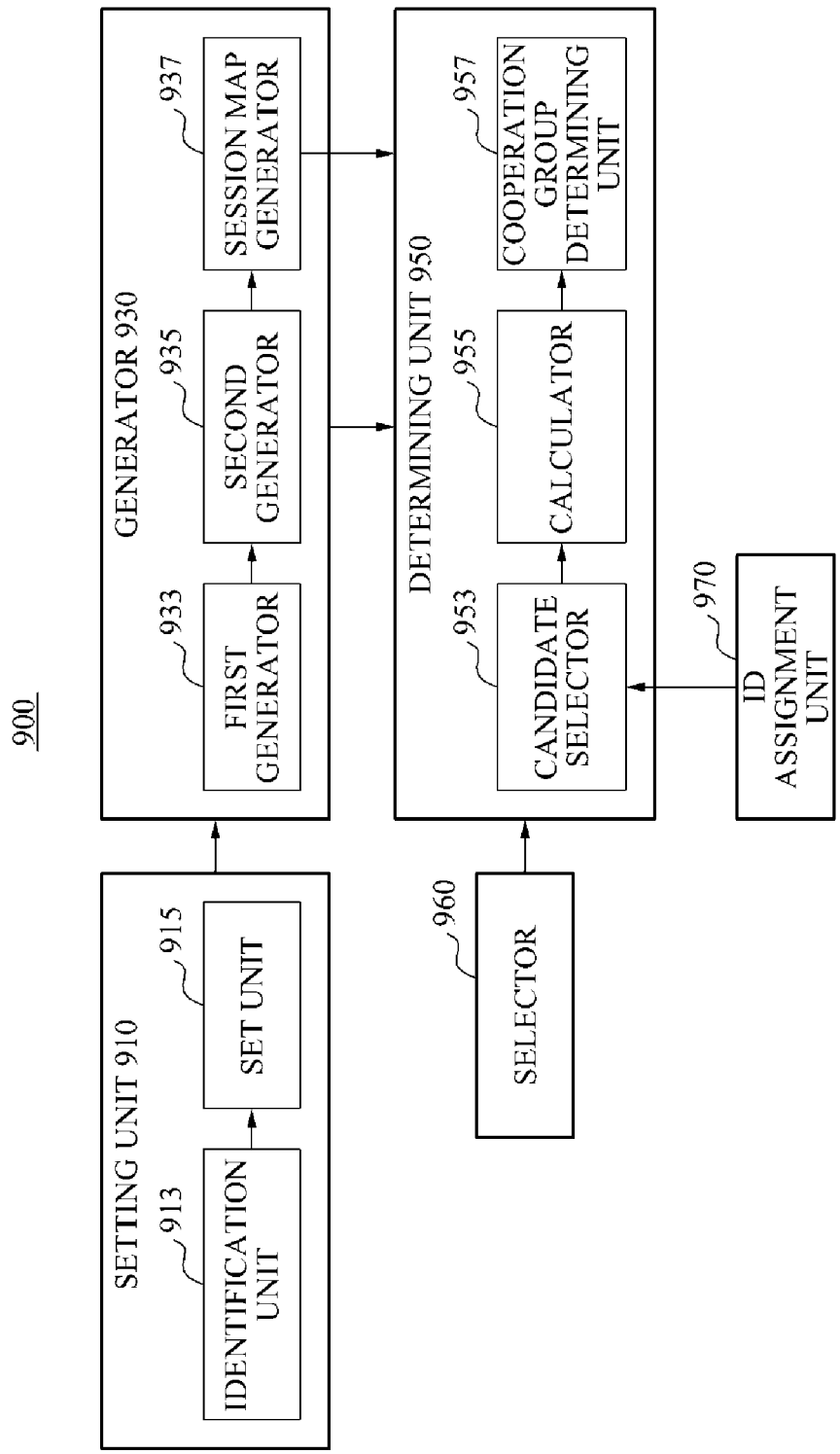

METHOD AND APPARATUS FOR COOPERATIVE SCHEDULING USING INTERFERENCE BETWEEN MULTIPLE POINTS

CROSS-REFERENCE TO RELATED APPLICATION(S)

This application claims the benefit under 35 U.S.C. §119 (a) of Korean Patent Application No. 10-2011-0062786, filed on Jun. 28, 2011, in the Korean Intellectual Property Office, the entire disclosure of which is hereby incorporated by reference.

BACKGROUND

1. Field

The following description relates to a method and apparatus for a cooperative scheduling using interference between multiple points.

2. Description of Related Art

In current communication environments, a problem may arise when a rapid increase in an amount of communication traffic occurs. Such rapid increase in the amount of communication traffic may be a result of electronic devices communicating at one time. For example, a high number of devices communicating may include a smart device, a sensor device, and the like. Current cellular communications are normally not capable of handling the rapid increase in the amount of communication traffic.

Another problem that may occur in current communication environments may be a limited amount of conventional frequency resource, which may be insufficient to support the increase in number of communication terminals or electronic devices and the increase in the amount of communication traffic. A conventionally used frequency band may not sufficiently enhance frequency efficiency. In some instances, a frequency band of several tens of GHz may be used for a wideband frequency resource. However, the wideband frequency resource may have an issue such as a relatively short transmission distance due to path loss.

Accordingly, there is a need of an apparatus and a method that would be configured to more efficiently communicate with a reduced delay by communicating using multiple hops or communicating directly in a relatively short distance, while reducing a load of a cellular communication system through a peer-to-peer communication scheme rather than a conventional cellular communication scheme. Further, there is a need of an apparatus and a method that may compensate for interference due to a resource reuse while enabling a terminal communicating with other terminals to reuse a frequency resource as efficiently as possible.

SUMMARY

In accordance with an illustrative example, a method is described for a cooperative scheduling using interference between multiple points. The method includes setting, for each link, a cooperation set including cooperation links for a cooperative scheduling. The method includes generating a cooperation session map defining a cooperation link selected from the cooperation set for each link in each session of a network. The method further includes determining a cooperation group to be scheduled simultaneously using the cooperation session map.

In accordance with another illustrative example, an apparatus is described for a cooperative scheduling using interference between multiple points. The apparatus includes a setting unit configured to set, for each link, a cooperation set including cooperation links for a cooperative scheduling. The apparatus includes a generator configured to generate a cooperation session map that defines at least one cooperation link selected from the cooperation set for each link in each session of a network. The apparatus also includes a determining unit configured to determine a cooperation group to be scheduled simultaneously using the cooperation session map.

Other features and aspects will be apparent from the following detailed description, the drawings, and the claims.

BRIEF DESCRIPTION OF THE DRAWINGS

FIGS. 2A, 2B, and 2C are diagrams illustrating a base unit to perform a cooperative scheduling using interference between multiple hops, in accordance with an illustrative example.

FIG. 7 is a diagram illustrating a method of selecting a candidate group for a cooperative scheduling, in accordance with an illustrative example.

FIG. 8 is a diagram illustrating a method of performing a scheduling using an ultimately determined cooperation group in a cooperative scheduling using interference between multiple hops, in accordance with an illustrative example.

FIG. 9 is a block diagram illustrating an apparatus for a cooperative scheduling using interference between multiple hops, in accordance with an illustrative example.

Figure 1:
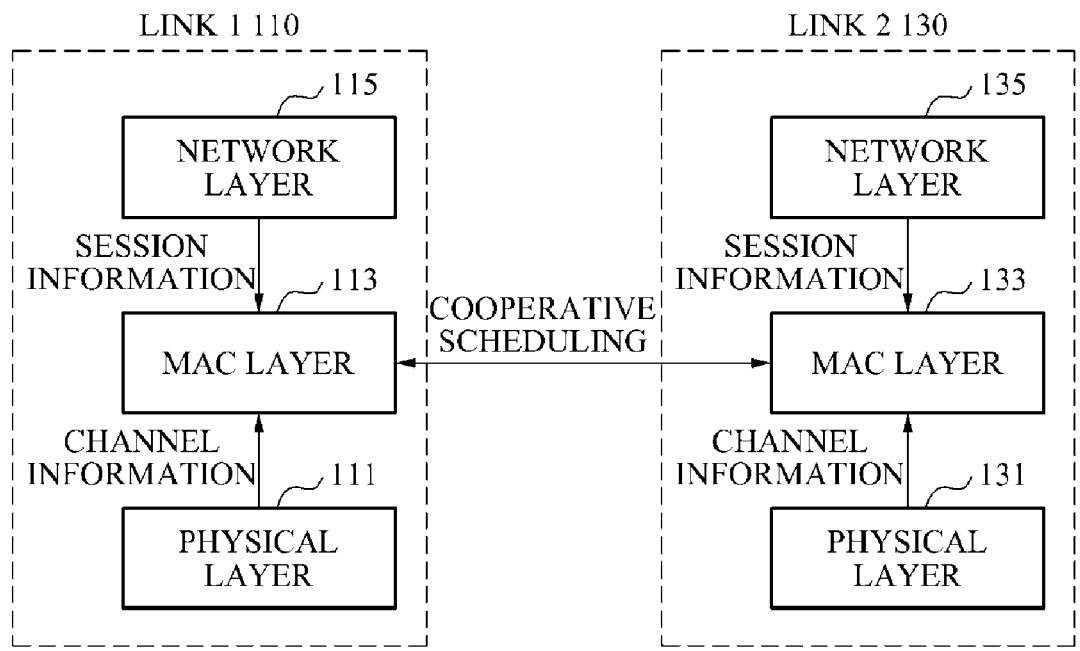
FIG. 1 is a diagram illustrating a cross-layer structure of a network to perform a cooperative scheduling using interference between multiple hops, in accordance with an illustrative example.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates a cross-layer structure of a network to perform a cooperative scheduling using interference between multiple hops, in accordance with an illustrative example.

The cooperative scheduling using interference between multiple hops, according to various examples described herein, may correspond to a scheduling operation performed in a media access control (MAC) layer of a network.

Referring to FIG. 1, a block defined by a dotted line on the left side of FIG. 1 illustrates a network hierarchical structure 110 of a link 1. The network hierarchical structure 110 includes a network layer 115, a MAC layer 113, and a physical layer 111. A block defined by a dotted line on the right side of FIG. 1 illustrates a network hierarchical structure 130 of a link 2. The network hierarchical structure 130 includes a network layer 135, a MAC layer 133, and a physical layer 131.

The physical layer 111 may transmit channel information of the link 1 to the MAC layer 113. The network layer 115 may transmit session information of the link 1, including routing information and quality of service (QoS) information, to the MAC layer 113.

The physical layer 131 may transmit channel information of the link 2 to a MAC layer 133. The network layer 135 may transmit session information of the link 2, including routing information and QoS information, to the MAC layer 133.

The physical layer 111 of the link 1 and the physical layer 131 of the link 2 may transmit to the MAC layer 113 and the MAC layer 133, respectively, information associated with a related channel and an amount of interference to enable the MAC layer 113 and the MAC layer 133 to determine an interference use scheme to be applied. The information associated with the related channel and the amount of interference may include, but is not limited to, a signal to noise ratio (SNR), an interference to noise ratio (INR), a signal to interference-plus-noise ratio (SINR), and an interference plus signal to noise ratio (ISNR).

The MAC layer 113 of the link 1 and the MAC layer 133 of the link 2 may determine an optimum scheduling set. The optimum scheduling set may include a cooperation group that combines information exchanged between the MAC layer 113 and the MAC layer 133. When the same frequency is used to reuse a limited frequency resource efficiently, the same frequency may be also used for links not interfering with each other.

Thus, according to an illustrative example, the cross-layer structure may be used to receive, from an upper layer or a lower layer of the MAC layer 113 and the MAC layer 133, information used to determine whether each link 1 and 2 is interfered with by a cooperative scheduling. In this instance, it may be assumed that a structure capable of using or removing various types of interference of each physical layer is given, and an equation is predetermined to calculate a performance gain according to each structure.

Figure 2A:
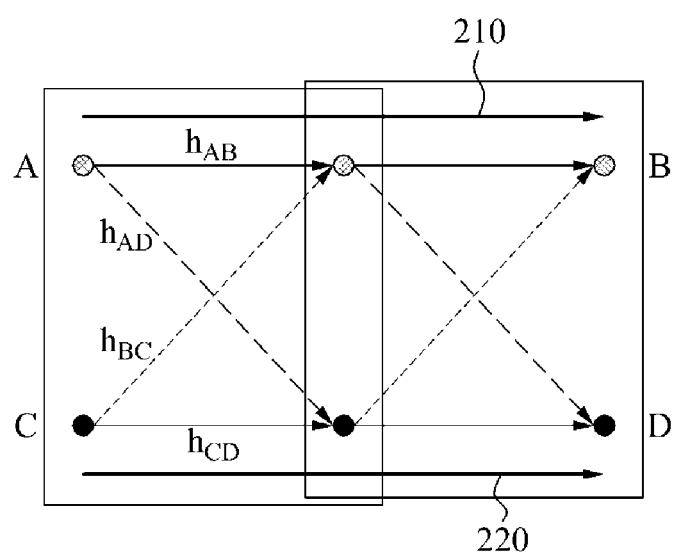
Figure 2B:
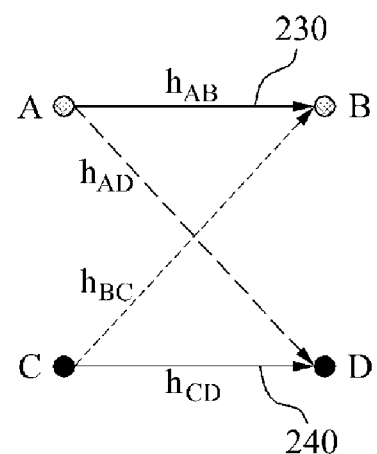

FIGS. 2A, 2B, and 2C illustrate a base unit to perform a cooperative scheduling using interference between multiple hops, in accordance with an illustrative example.

FIG. 2A illustrates a cooperation session based unit, FIG. 2B illustrates a cooperation link based unit, and FIG. 2C illustrates a hop based unit. In one example, the cooperation session based unit of FIG. 2A may include multiple hops, and the cooperation link based unit of FIG. 2B and the hop based unit of FIG. 2C may include a single hop.

FIG. 2A includes a first session 210 connecting a node A to a node B through an intermediate relay, and a second session 220 connecting a node C to a node D through an intermediate relay. The first session 210 and the second session 220 may correspond to a base unit, that is, a cooperation session based unit to be cooperatively scheduled. In the cooperation session based unit, a scheduling may be performed using, as a base unit, cooperation sessions. In other words, the scheduling may be performed using multiple hops to be cooperatively scheduled. In one illustrative example, a session may refer to a traffic flow from a source node to a destination node.

FIG. 2B includes a first link 230 from a node A to a node B, and a second link 240 from a node C to a node D. The first link 230 and the second link 240 may correspond to a base unit. In other words, the first link 230 and the second link 240 may function as a cooperation link based unit to be cooperatively scheduled.

The cooperation session based unit of FIG. 2A may include a plurality of cooperation link based units as illustrated and described in FIG. 2B. The cooperation link based unit of FIG. 2B may include two hop based units as illustrated and described in FIG. 2C.

In one illustrative example, a base unit configured to perform a cooperative scheduling using interference between multiple hops may generally correspond to the cooperation session based unit of FIG. 2A and the cooperation link based unit of FIG. 2B.

Figure 3:
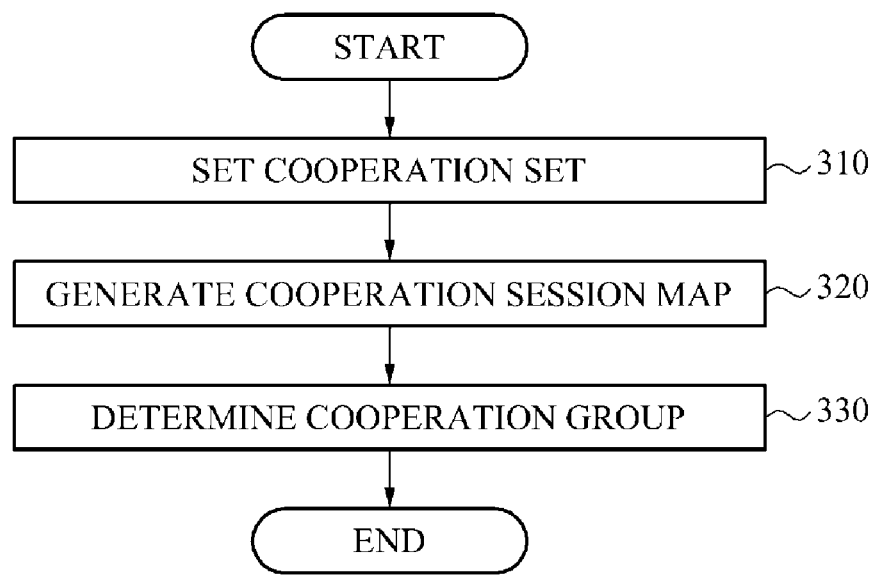
FIG. 3 is a flowchart illustrating a method for a cooperative scheduling using interference between multiple hops, in accordance with an illustrative example.

FIG. 3 illustrates a method for a cooperative scheduling using interference between multiple hops (hereinafter, referred to as a scheduling apparatus), in accordance with an illustrative example.

In 310, for each of a plurality of links, the method sets at least one cooperation set including cooperation links. In one example, the cooperation links may refer to links available for a cooperative scheduling. The links available for a cooperative scheduling may refer to links that may transmit signals by smoothly sharing a resource without damaging or negatively affecting each other due to interference occurring when a terminal reuses a resource, for example, a frequency.

In 320, the scheduling apparatus may generate a cooperation session map that defines at least one cooperation link, which is selected from the at least one cooperation set for each of the plurality of links in each session of a network. In one example, as illustrated in FIG. 1, the method of the scheduling apparatus may receive channel information from a physical layer of each of the cooperation links, and may receive session information including routing information and QoS information from a network layer of each of the cooperation links. As a result, in 320, the method of the scheduling apparatus may generate cooperation link tables using session information and channel information received from each layer. The method of the scheduling apparatus may generate a cooperation session map based on information verified from the cooperation map table that is generated using the cooperation link tables. As previously described, the cooperation link tables may be generated for each of the plurality of links. The cooperation session map may define at least one cooperation link, which may be selected from the at least one cooperation set for each session of a network.

In 330, the method determines a cooperation group to be scheduled simultaneously using the cooperation session map. Before determining the cooperation group, the method may select a base unit to perform a cooperative scheduling. The method may also determine the cooperation group from at least one candidate group of the cooperation group based on the base unit. In one illustrative example, the base unit to perform the cooperative scheduling may correspond to at least one of a hop based unit, a cooperation link based unit, and a cooperation session based unit described as described and illustrated in FIG. 2.

In the method for a cooperative scheduling using interference between multiple hops, according to some aspects of the present examples described herein, the plurality of links may correspond to links present in a distributed network structure or links present in a hierarchical network structure. When the plurality of links corresponds to links present in the distributed network structure, each of multiple points in the distributed network may dispersively share information about the cooperation group. The points may be include, but are not limited to, network nodes or section points, either as redistribution points or communication endpoints (some terminal equipment). In the alternative, when the plurality of links corresponds to links present in the hierarchical network structure, a predetermined point among multiple points in the hierarchical network may deliver information about the cooperation group to other points.

Each of the links present in the distributed network structure may collect information that may be used to determine the cooperation group. In the alternative, in the hierarchical network structure, the cooperation group may be determined using information received from each point at a hub, a base station, an access point, and the like corresponding to at least one main point among equivalent points (or nodes). In this instance, the at least one main point may transmit to other multiple points information about the determined cooperation group. In some illustrative examples, the method for a cooperative scheduling using interference between multiple hops may be applied to a partially dispersed structure and a totally dispersed structure in the hierarchical network structure. Several main points may be determined according to an infrastructure, and a point (or node) satisfying a predetermined requirements may be selected.

Figure 4:
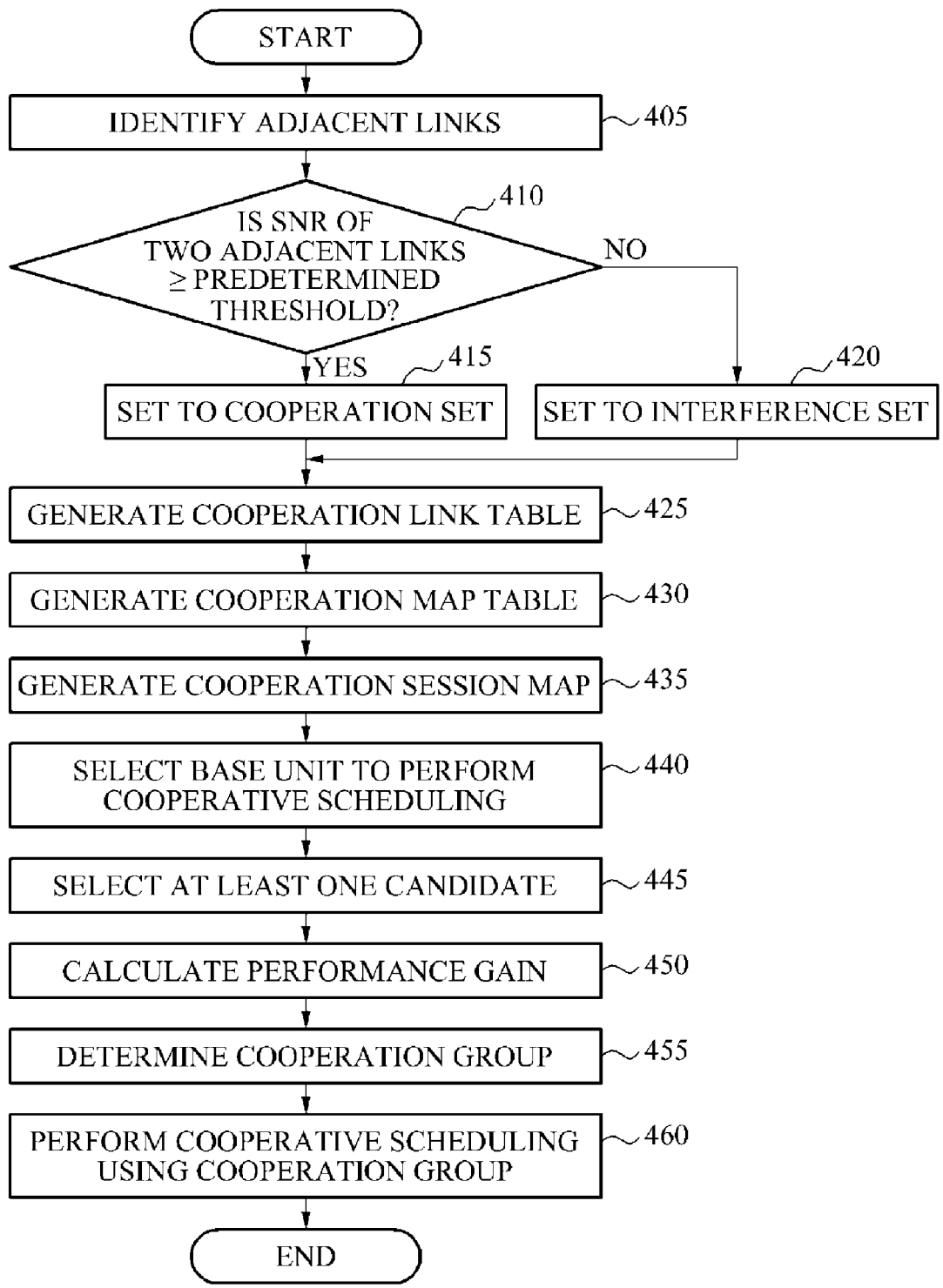
FIG. 4 is a flowchart further illustrating a method for a cooperative scheduling using interference between multiple hops, in accordance with another illustrative example.

FIG. 4 describes a method for a cooperative scheduling using interference between multiple hops, in accordance with an illustrative example.

In 405, the method of the scheduling apparatus identifies links adjacent to each other among a plurality of links. In one example, the links adjacent to each other may refer to links within an area in which the links may interfere with each other. For example, the links adjacent to each other may refer to links within an area in which a signal transmitted by a predetermined link may reach. In one illustrative example, the links adjacent to each other may include the configuration as illustrated and described in FIG. 1, in which the links may include the network hierarchical structures 110 and 130, respectively.

The method may set, to at least one cooperation set, adjacent links available for a cooperative scheduling using interference between the adjacent links.

In one example, interference existing between the adjacent links may be used through data exchange and channel information between sessions using a relay channel, or through an interference channel between at least two users. When the relay channel is used, an interference channel may be scheduled, depending on a channel state. In the alternative, when the relay channel is used, a signal channel and an interference channel may be scheduled, depending on the channel state. In one example, in the relay channel, an amplify and forward (AF)/decode and forward (DF)/compress and forward (CF) scheme, or the like may be selected and used according to a location and a channel of a relay.

In 410, the method determines whether an SNR of the two links cooperating with each other among the adjacent links is greater than or equal to a predetermined threshold.

In 415, when the SNR of the two links cooperating with each other is determined to be greater than or equal to the predetermined threshold in 410, the method defines the two links to be at least one cooperation set. For example, before cooperating with each other, the SNR of a link A and a link B may be determined to be less than or equal to a predetermined threshold using Equation 1 as follows.

$$\frac{S}{I} \leq \gamma \qquad \text{[Equation 1]}$$

Here, S denotes a magnitude of a signal, I denotes a magnitude of interference at the corresponding link, and γ denotes a predetermined threshold, for example, a threshold used for the corresponding link.

As shown in Equation 2 below, after the link A and the link B cooperate with each other and the SNR is greater than or equal to a threshold γ, the link A and the link B may correspond to a cooperation link to be scheduled together, that is, a cooperation set available for a cooperative scheduling.

$$\frac{S + S'(c, H)}{I - I'(c, H)} \geq \gamma \qquad \text{[Equation 2]}$$

Here, S' denotes a signal gain generated by performing a cooperation, and I' denotes an interference gain generated by performing the cooperation. Further, c denotes a cooperation scheme used for the cooperation, and H denotes a channel used during the cooperation.

In 420, when the SNR of the two links cooperating with each other is determined to be less than the predetermined threshold in 410, the method defines the two links to be an interference set. The interference set may refer to interference links unavailable for a cooperative scheduling using interference between adjacent links. For example, an interference link unavailable for a cooperative scheduling between link A and link B and satisfying Equation 3 during a scheduling may refer to an interference set.

$$\frac{S + S'(c, H)}{I - I'(c, H)} < \gamma \qquad \text{[Equation 3]}$$

The method may generate a cooperation map table based on at least one cooperation set. The cooperation map table may indicate whether cooperation between a plurality of links is to be performed.

In 425, for each of the links, the method generates cooperation link tables including information associated with a cooperation between the links based on the at least one cooperation set. A method of generating the cooperation link tables will be further described with reference to FIG. 5. The information associated with the cooperation between the links may include, for example, information about a cooperation scheme, a cooperation gain, a channel between the links, queue information of each of the links, and/or session information. In one example, the queue information of each of the links may refer to an amount of traffic waiting to be transmitted at a buffer of each of the links. For example, the queue information may be expressed as information about a buffer size of each of the plurality of links.

The method in the scheduling apparatus may generate cooperation link tables using channel information received from a physical layer of each of the cooperation links. The method may further generate the cooperation link tables also using session information received from a network layer of each of the cooperation links. The session information may include routing information and QoS information.

In 430, the method generates a cooperation map table using the cooperation link tables generated for each of the links. The cooperation map table will be described with reference to illustrative Table 1.

TABLE 1

| Set | L1 | L2 | L3 | L4 | L5 | L6 | L7 |
|---|---|---|---|---|---|---|---|
| L1 | Session(L1) | 0.9(C1) | 0 | 0.6(C2) | 0 | 0.5(C2) | 0 |
| L2 | 0.5(C1) | Session(L2) | 0.8(C2) | | | | 0.2(C1) |
| L3 | | | | | | | |
| L4 | | | | | | | |
| L5 | | | | | | | |
| L6 | | | | | | | |
| L7 | | | | | | | |

Figure 5:
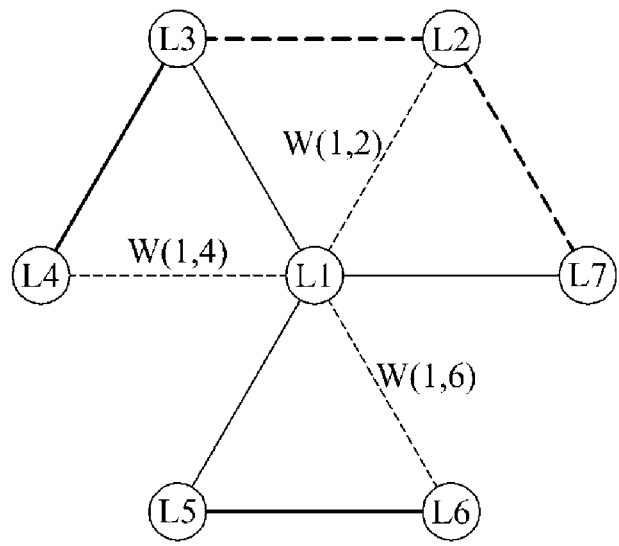
FIG. 5 is a diagram illustrating a method of generating a cooperation link table, in accordance with an illustrative example.

Table 1 illustrates a cooperation map table generated using a cooperation link table, to be illustrated and described in FIG. 5, which is generated for each of the links. The cooperation map table may be generated by combining information about the cooperation link tables for each of the links. In the cooperation map table, a first row may indicate the plurality of links, a second row may indicate information about the cooperation map table for a link 1 L1, and a third row may indicate information about the cooperation map table for a link 2 L2. A person of ordinary skill in the relevant art will appreciate that the cooperation map table may include additional rows additional information.

Referring to FIG. 5, in a row of the link 1 L1 in the cooperation map table, the link 1 L1 cooperates with the link 2 L2 by a rate-spirit scheme C1 with a cooperation gain of 0.9. The link 1 L1 cooperates with a link 4 L4 and a link 6 L6 by an interference avoidance scheme C2 with cooperation gains of 0.6 and 0.5, respectively. In a row of the link 2 L2, the link 2 L2 cooperates with the link 1 L1 and a link 7 L7 by the rate-spirit scheme C1 with cooperation gains of 0.5 and 0.2, respectively, and cooperates with a link 3 L3 by the interference avoidance scheme C2 with a cooperation gain of 0.8. In the cooperation map table, information about a cooperation link table for each of the link 3 L3 and the link 7 L7 may be indicated. In addition, the cooperation gains illustrated and described for FIG. 5 are for illustrative purposes only. The cooperation gains between the link 1 L1 and the links 2 L2 to 7 L7 may range from 0.0 to 1.0. A person of ordinary skill in the relevant art will appreciate that various ranges may be implemented to illustrate the cooperation between the links.

In 435, the method generates a cooperation session map based on information verified from the cooperation map table. The cooperation session map may define at least one cooperation link selected from at least one cooperation set for each session of a network. The cooperation session map and a relationship between links verified from the cooperation session map will be described with reference to FIG. 6.

In 440, the scheduling apparatus selects a base unit to perform a cooperative scheduling. In one example, the scheduling apparatus may select the base unit to perform a cooperative scheduling based on at least one of a load of a network according to the base unit, a structure of a physical layer according to the base unit, a cooperation gain according to the base unit, a cooperation scheme according to the base unit, and information received from each layer of the network. In one configuration, the base unit to perform a cooperative scheduling may correspond to at least one of a hop based unit, a cooperation link based unit, and a cooperation session based unit. In one example, the scheduling apparatus may determine a cooperation group to be scheduled simultaneously using the cooperation session map.

In 445, the scheduling apparatus selects at least one candidate group based on the base unit to perform the cooperative scheduling in the at least one cooperation link, which is defined in the cooperation session map.

The scheduling apparatus may assign a group identification (ID) to each of the at least one candidate group. In FIG. 7, to be later described, illustrates a method of selecting a candidate group to perform a cooperative scheduling and a method of assigning a group ID to each candidate group to perform a cooperative scheduling.

In 450, the scheduling apparatus calculates a performance gain for each of the at least one candidate group.

In 455, the scheduling apparatus determines a cooperation group to be scheduled simultaneously among the at least one candidate group based on a result of the calculation. For example, the scheduling apparatus determines the cooperation group in a descending order of performance based on whether a performance gain of each of the at least one candidate group is relatively high.

In 460, the scheduling apparatus performs a cooperative scheduling using the cooperation group.

FIG. 5 illustrates a method of generating a cooperation link table, in accordance with an illustrative example. In FIG. 5, Links 1 L1 to 7 L7 are illustrated in communication. A dotted line between links 1 L1 and 2 L2, links 1 L1 and 4 L4, links 1 L1 and 6 L6, links 2 L2 and 3 L3, and links 2 L2 and 7 L7 may indicate links that may cooperate with each other. A solid line between links 1 L1 and 3 L3, links 1 L1 and 5 L5, links 1 L1 and 7 L7, links 3 L3 and 4 L4, and links 5 L5 and 6 L6 may indicate links that may not cooperate with each other. A scheduling device may generate the cooperation link table for each of the links.

Thus, in one illustrative example, the link 1 L1 may have a cooperation set relationship with the link 2 L2, the link 4 L4, and the link 6 L6, and may experience an interference set relationship with the link 3 L3, the link 5 L5, and the link 7 L7. Consequently, the link 1 L1 may cooperate with the link 2 L2, the link 4 L4, and the link 6 L6, and may not cooperate with the link 3 L3, the link 5 L5, and the link 7 L7. Further, the link 2 L2 may have a cooperation set relationship with the link 3 L3, the link 1 L1, and the link 7 L7.

In one illustrative example, the link 1 L1 may cooperate with the link 2 L2 by a rate-spirit scheme with a cooperation gain of 0.9, and may cooperate with the link 4 L4 and the link 6 L6 by an interference avoidance scheme with cooperation gains of 0.6 and 0.5, respectively. In an example, a session A and a session B may pass through the link 1 L1, and the session A and a session C may pass through the link 2 L2, a cooperation link table for the link 1 L1 may be expressed as shown in a table at a bottom of FIG. 5. As previously described, the cooperation gains illustrated and described for FIG. 5 are for illustrative purposes only. The cooperation gains between the link 1 L1 and the links 2 L2 to 7 L7 may range from 0.0 to 1.0. A person of ordinary skill in the relevant art will appreciate that various ranges may be implemented to illustrate the cooperation between the links.

In the cooperation link table shown in FIG. 5, L1, L2, . . . , L7 of a first row indicate each link, and "session" of a second row indicates a session passing through a plurality of links corresponding to the first row. Thus, the session A and the session B are indicated in the link 1 L1, and the session A and the session C are indicated in the link 2 L2. In the cooperation link table, each of C0, C1, and C2 indicates a cooperation scheme, for example, C0 indicates no cooperation, C1 indicates a rate-sprit scheme, and C2 indicates an interference avoidance scheme.

In one example, because the link 1 L1 may have a cooperation set relationship with the link 2 L2, the link 4 L4, and the link 6 L6, a corresponding cooperation scheme and gain may be recorded in a column of the link 2 L2, the link 4 LA, and the link 6 L6, respectively. Also, because the link 1 L1 may have an interference set relationship with the link 3 L3, the link 5 L5, and the link 7 L7, "0" may be recorded in a row C0 indicating that cooperation is not performed for each column of the link 3 L3, the link 5 L5, and the link 7 L7.

In one illustrative example, the cooperation link table may be generated for each of adjacent links in addition to the link 1 L1. In one configuration, the cooperation link table may be generated between adjacent links having a one-hop relationship.

Figure 6:
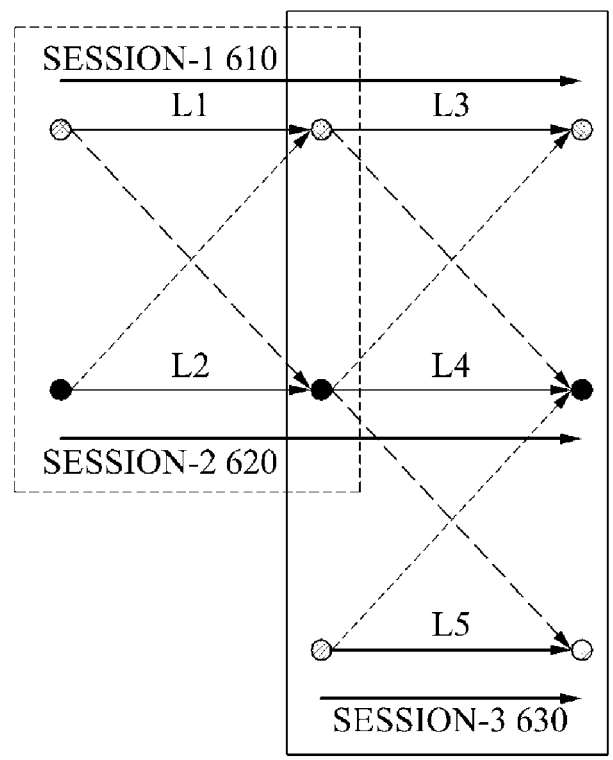
FIG. 6 is a diagram illustrating a cooperation session map and a relationship between links verified from the cooperation session map, in accordance with an illustrative example.

FIG. 6 illustrates a cooperation session map and a relationship between links verified from the cooperation session map, in accordance with an illustrative example.

The cooperation session map, at a top of FIG. 6, defines a cooperation link in a cooperation session based unit. In one example, the cooperation session based unit may be a multi-hop unit for each session of a network based on information verified from the cooperation map table. Thus, a session passing through each link and links cooperating with each link may be verified from the cooperation session map. The cooperation session map may correspond to a table rearranged based on session information from the cooperation map table.

In the cooperation session map, a link 1 L1 may be passed through by a session 1, and may cooperate with a link 2 L2. The link 2 L2 may be passed through by a session 2, and may cooperate with the link 1 L1. A link 3 L3 may be passed through by the session 1, and may cooperate with a link 4 L4. The link 4 L4 may be passed through by the session 2, and may cooperate with the link 3 L3 and a link 5 L5. The link 5 L5 may be passed through by a session 3, and may cooperate with the link 4 L4.

A relationship between links verified from the cooperation session map may be expressed as shown at a bottom of FIG. 6. For example, links passed through by a session (1) 610 may correspond to a link 1 L1 and a link 3 L3. Links passed through by a session (2) 620 may correspond to a link 2 L2 and a link 4 L4. A link passed through by a session (3) 630 may correspond to a link 5 L5. In one configuration, each of the links passed through by the same session may be disposed on the same session. For example, the link 1 L1 and the link 2 L2 may be disposed in parallel because the link 1 L1 and the link 2 L2 may cooperate with each other. In a further example, the link 3 L3, the link 4 L4, and the link 5 L5 may be disposed in parallel because the link 3 L3 cooperates with the link 4 L4, the link 4 L4 cooperates with the link 5 L5, and the link 4 L4 cooperates with the link 3 L3 and the link 5 L5.

In an illustrative configuration, links disposed in parallel may be scheduled simultaneously when a scheduling is performed in a cooperation link based unit.

FIG. 7 illustrates a method of selecting a candidate group for a cooperative scheduling, in accordance with an illustrative example.

In one configuration, the method of the scheduling apparatus may select at least one candidate group based on a base unit to perform a cooperative scheduling in the at least one cooperation link defined in a cooperation session map.

The cooperation session map of FIG. 7 illustrates that a link passed through by a session 1 may correspond to a link 1 L1 and a link 3 L3. A link passed through by a session 2 may correspond to a link 2 L2 and a link 4 L4. A link passed through by a session 5 may correspond to a link 5 L5. In one illustrative example, the link 1 L1 and the link 3 L3 passed through by the same session 1 may not be scheduled simultaneously when the base unit to perform a cooperative scheduling corresponds to a cooperation link based unit because the link 3, L3 receives a signal or data delivered from the link 1 L1. In another illustrative example, the link 2 L2 and the link 4 L4 passed through by the same session 2 may not be scheduled simultaneously. In one configuration, the link 1 L1 and the link 2 L2 may be scheduled simultaneously to correspond to a first candidate group for a cooperative scheduling 710. Also, the link 3 L3 and the link 4 LA may be scheduled simultaneously to correspond to a second candidate group for a cooperative scheduling 730.

In the alternative, when the base unit to perform a cooperative scheduling corresponds to a cooperation session based unit, the link 1 L1 and the link 3 L3 may be scheduled simultaneously with the link 2 L2 and the link 4 LA. The link 1 L1 and the link 3 L3 may be scheduled simultaneously with the link 2 L2 and the link 4 L4 because the link 1 L1 and the link 3 L3 may be simultaneously passed through by the session 1, and the link 2 L2 and the link 4 L4 may be simultaneously passed through by the session 2. Thus, in one configuration, the link 1 L1, the link 2 L2, the link 3 L3, and the link 4 LA may correspond to a third candidate group for a cooperative scheduling 750. In this instance, in a table as shown in FIG. 7, links indicated by "X" for each session may not be scheduled simultaneously. A simultaneous scheduling may not be performed for the link 1 L1 and the link 3 L3 because the link 3 L3 may correspond to a link adjacent to the link 1 L1 on a routing path through which the session 1 passes. Here, the session 1 may pass through "L1-L3- . . . . "

Referring to FIG. 7, in one example, when the base unit to perform a cooperative scheduling corresponds to a cooperation link based unit, such as the first candidate group for a cooperative scheduling 710 and the second candidate group for a cooperative scheduling 730, a sub group ID may be assigned for each of at least one candidate. In another example, when the base unit to perform a cooperative scheduling corresponds to a cooperation session based unit such as the third candidate group for a cooperative scheduling 750, a group ID may be assigned for at least one candidate.

In illustrative examples, a candidate group for a cooperative scheduling based on a cooperation link based unit may be included in several other cooperation session based units rather than a single cooperation session based unit.

FIG. 8 illustrates a method of performing a scheduling using an ultimately determined cooperation group in a cooperative scheduling using interference between multiple hops, in accordance with an illustrative example.

Referring to FIG. 8, a link 1 L1, a link 2 L2, a link 3 L3, and a link 4 L4 correspond to a cooperation group, which may be referred to as a first cooperation group. A link 6 L6 and a link 7 L7 correspond to another cooperation group, which may be referred to as a second cooperation group. In this example, a link 5 L5 corresponds to a link that may be scheduled along with each of the cooperation groups. Although the terms first and second are being used, these terms are simply being used to differentiate between the cooperation groups. The first and second terms do not define a particular order that the groups need to be structured, to function, or to operate. A person of ordinary skill in the relevant art would appreciate that the links may be associated in an alternative order between cooperation groups.

In one illustrative example, cooperation for the first cooperation group may be performed through two-hops because a base unit to perform a cooperative scheduling may correspond to a cooperation session based unit. As an example, when the first cooperation group is scheduled with the second cooperation group that is performed in one-hop, the link 1 L1 and the link 2 L2 included in the first cooperation group may be scheduled along with the second cooperation group at time (T)=1. In this example, the link 5 L5 may be scheduled as well. At T=2, the second cooperation group transmitting a signal different from a signal transmitted at T=1 may be scheduled along with the link 3 L3 and the link 4 L4 included in the first cooperation group.

FIG. 9 illustrates an apparatus for a cooperative scheduling 900 using interference between multiple hops, in accordance with an illustrative example.

The apparatus for a cooperative scheduling 900 using interference between multiple hops may include a setting unit 910, a generator 930, and a determining unit 950.

The setting unit 910 may set, for each of a plurality of links, at least one cooperation set including cooperation links. In one example, the cooperation links may correspond to links to be scheduled cooperatively.

The setting unit 910 may include an identification unit 913 and a set unit 915. The identification unit 913 may identify links adjacent to each other among the plurality of links. For at least one cooperation set, the set unit 915 may set adjacent links available for a cooperative scheduling using interference between the adjacent links among the links adjacent to each other.

The generator 930 may generate a cooperation session map that defines at least one cooperation link selected from the at least one cooperation set for each of the plurality of links in each session of a network. The generator 930 may also include a first generator 933, a second generator 935, and a session map generator 937. Based on the at least one cooperation set and for each of the plurality of links, the first generator 933 may generate cooperation link tables including information associated with cooperation between the plurality of links. The second generator 935 may generate the cooperation map table using the cooperation link tables generated for each of the plurality of links. Based on information obtained from the cooperation map table and for each session of the network, the session map generator 937 may generate the cooperation session map that defines the at least one cooperation link selected from the at least one cooperation set.

The determining unit 950 may determine a cooperation group to be scheduled simultaneously using the cooperation session map. The determining unit 950 may include a candidate selector 953, a calculator 955, and a cooperation group determining unit 957. The candidate selector 953 may select at least one candidate group based on the base unit to perform the cooperative scheduling, in the at least one cooperation link defined in the cooperation session map. The calculator 955 may calculate a performance gain for each of the at least one candidate group. The cooperation group determining unit 957 may determine the cooperation group to be scheduled simultaneously among the at least one candidate group based on a result of the calculation.

In an illustrative example, the apparatus for a cooperative scheduling 900 using interference between multiple hops may further include a selector 960 and an ID assignment unit 970. The selector 960 may select a base unit to perform the cooperative scheduling. The ID assignment unit 970 may assign a group ID for each of the at least one candidate group.

According to some illustrative examples described above, it is possible to determine a link that may be scheduled simultaneously and at the same frequency by employing a cooperation session map based on a cooperation set to be cooperatively scheduled using interference between links.

According to some illustrative examples described, it is possible to satisfy rapidly increasing service demands of a communication terminal without affecting a performance of a cellular communication system by simultaneously scheduling links available for a cooperative scheduling so as to effectively reuse limited frequency resources.

According to some illustrative examples described, it is possible to provide a service to a great number of users at large-scale venues, large or small. These venues may include, but are not limited to, a stadium, an airport, a mall, and the like. In these venues peer to peer (P2P) communication may frequently occur in a crowded environment by efficiently reusing limited frequency resources.

The processes, functions, methods and/or software described above including a method for a cooperative scheduling using interference between multiple points may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts.

It is to be understood that in the examples described above, the operations in FIGS. 3-5 and 7-8 are performed in the sequence and manner as shown although the order of some steps and the like may be changed without departing from the spirit and scope of the present invention. In accordance with an illustrative example, a computer program embodied on a non-transitory computer-readable medium may also be provided, encoding instructions to perform at least the method described in FIGS. 3-5 and 7-8.

Program instructions to perform a method described in FIGS. 3-5 and 7-8, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for a cooperative scheduling using interference between multiple points, the method comprising:
 identifying adjacent links which interfere with each other;
 setting, based on the adjacent links, a cooperation set comprising cooperation links, wherein the cooperation links comprise a first link between a first set of nodes and a second link between a second set of nodes that function together to be cooperatively scheduled as the cooperation set,
 wherein cooperative scheduling refers to links that transmit signals by sharing a resource without damaging or negatively affecting each other due to interference occurring when a terminal reuses a resource;
 generating, based on the cooperation set, a cooperation session map comprising information about multi-hop cooperation links,
 wherein a cooperation session map defines at least one cooperation link selected from at least one cooperation set for each session of a network, indicates whether cooperation is performed between links based on the cooperation set, and defines the cooperation link selected from the cooperation set based on the information obtained from the cooperation map table; and
 determining a cooperation group of cooperation links to be scheduled simultaneously using the cooperation session map,
 receiving, from a network layer of each of the cooperation links, session information including routing information and quality of service (QoS) information.

2. The method of claim 1, further comprising:
 receiving channel information from a physical layer of each of the cooperation links.

3. The method of claim 1, wherein the setting comprises:
 identifying links adjacent to each other; and
 setting, for the cooperation set, adjacent links available for a cooperative scheduling using interference between the adjacent links among the links adjacent to each other.

4. The method of claim 3, wherein the setting comprises:
 setting, for the cooperation set, two adjacent links performing cooperation with each other among the adjacent links when a signal-to-noise ratio (SNR) of the two adjacent links is greater than or equal to a predetermined threshold.

5. The method of claim 3, further comprising:
 setting adjacent links unavailable for a cooperative scheduling using interference between the adjacent links among the links adjacent to each other.

6. The method of claim 1, wherein the generating comprises:
 generating, for each link, cooperation link tables including information associated with cooperation between the links based on the cooperation set; and
 generating the cooperation map table using the cooperation link tables generated for each link.

7. The method of claim 6, wherein the information associated with cooperation between the links includes at least one of information about a cooperation scheme, a cooperation gain, a channel between the links, queue information of each link, and session information.

8. The method of claim 1, further comprising:
 selecting a base unit to perform the cooperative scheduling.

9. The method of claim 8, wherein the selecting comprises:
 selecting the base unit to perform the cooperative scheduling based on at least one of a load of a network according to the base unit, a structure of a physical layer according to the base unit, a cooperation gain according to the base unit, a cooperation scheme according to the base unit, and information received from each layer of the network.

10. The method of claim 8, wherein the base unit to perform the cooperative scheduling corresponds to at least one of a hop based unit, a cooperation link based unit, and a cooperation session based unit.

11. The method of claim 8, wherein the determining comprises:
 selecting a candidate group to perform the cooperative scheduling in the cooperation link defined in the cooperation session map;
 calculating a performance gain for the candidate group; and
 determining the cooperation group to be scheduled simultaneously on the candidate group based on a result of the calculation.

12. The method of claim 11, wherein the determining comprises:
 determining the cooperation group based on whether the performance gain of the candidate group is relatively high.

13. The method of claim 11, further comprising:
 assigning a group identification (ID) to the candidate group.

14. The method of claim 13, wherein the assigning comprises:
 assigning a sub group ID to the candidate group when the base unit to perform the cooperative scheduling corresponds to a cooperation link based unit, and
 assigning a group ID to the candidate group when the base unit to perform the cooperative scheduling corresponds to a cooperation session based unit.

15. The method of claim 1, wherein the link corresponds to a link present in a distributed network structure in which each of multiple points dispersedly shares information about the cooperation group or a link present in a hierarchical network structure in which a predetermined point among multiple points delivers information about the cooperation group to other points.

16. A computer program embodied on a non-transitory computer readable medium, the computer program being configured to control a processor to perform the method of claim 1.

17. The method of claim 1, wherein the cooperation links comprise links that transmit signals by sharing a resource without negatively affecting each other due to interference with each other in response to a terminal for each link using the resource.

18. The method of claim 1, further comprising determining the cooperative group based on information collected from each the links in the distributed network structure.

19. An apparatus for a cooperative scheduling using interference between multiple points, the apparatus comprising:

a setting unit configured to identify adjacent links which interfere with each other, and to set, based on the adjacent links, a cooperation set including cooperation links, wherein the cooperation links comprise a first link between a first set of nodes and a second link between a second set of nodes that function together to be cooperatively scheduled as the cooperation set, wherein cooperative scheduling refers to links that transmit signals by sharing a resource without damaging or negatively affecting each other due to interference occurring when a terminal reuses a resource;

a generator configured to generate, based on the cooperation set, a cooperation session map comprising information about multi-hop cooperation links, wherein a cooperation session map defines at least one cooperation link selected from at least one cooperation set for each session of a network, indicates whether cooperation is performed between links based on the cooperation set, and defines the cooperation link selected from the cooperation set based on the information obtained from the cooperation map table; and a determining unit configured to determine a cooperation group of cooperation links to be scheduled simultaneously using the cooperation session map;

receiving, from a network layer of each of the cooperation links, session information including routing information and quality of service (QoS) information.

20. The apparatus of claim 19, wherein the generator comprises:

a first generator configured to generate, for each link, cooperation link tables comprising information associated with cooperation between links based on the cooperation set;

a second generator configured to generate the cooperation map table using the cooperation link tables generated for each link.

21. The apparatus of claim 19, further comprising:

a selector configured to select a base unit to perform the cooperative scheduling, wherein the determining unit comprises:

a candidate selector configured to select a candidate group based on the base unit to perform the cooperative scheduling in the cooperation link defined in the cooperation session map;

a calculator configured to calculate a performance gain for the candidate group; and a cooperation group determining unit to determine the cooperation group to be scheduled simultaneously on the candidate group based on a result of the calculation.

22. The apparatus of claim 19, wherein the link corresponds to a link present in a distributed network structure in which each of multiple points dispersedly shares information about the cooperation group or a link present in a hierarchical network structure in which a predetermined point among multiple points delivers information about the cooperation group to other points.

\* \* \* \* \*